No. 825,425. PATENTED JULY 10, 1906.
D. C. SHAW.
TYPE HANDLING IMPLEMENT FOR PRINTERS.
APPLICATION FILED FEB. 23, 1906.
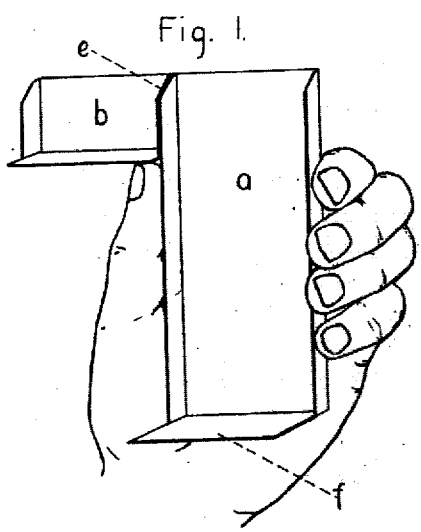
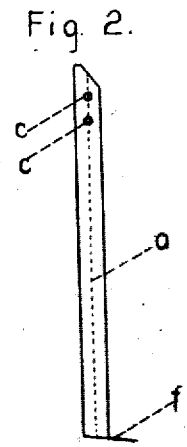
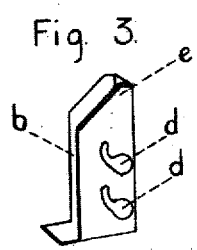
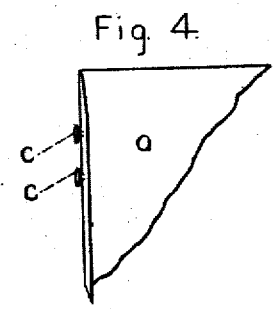
Witnesses:-
Inventor
Dewey C. Shaw,
By Owsley Wilson
Attorney.

UNITED STATES PATENT OFFICE.

DEWEY C. SHAW, OF LINCOLN, NEBRASKA.

TYPE-HANDLING IMPLEMENT FOR PRINTERS.

No. 825,425.    Specification of Letters Patent.    Patented July 10, 1906.

Application filed February 23, 1906. Serial No. 302,633.

*To all whom it may concern:*

Be it known that I, DEWEY C. SHAW, a citizen of the United States, residing at Lincoln, in the county of Lancaster and State of Nebraska, have invented a certain new and useful Type-Handling Implement for Printers, of which the following is a specification sufficiently clear to enable those skilled in the art to which it appertains to make and use the same.

My invention relates to a printer's implement or combined tool; and its object is, first, to provide a practical implement or tool with which type may be taken from an imposing-stone and sorted, distributed, wet down, carried about, or handled, as desired, with the minimum of danger from dropping, mixing, or making pi; second, to provide a practical implement or tool in which type so nearly pied as to prevent lifting by hand may be slid from an imposing-stone and handled with ease; third, to provide a practical implement small enough to be conveniently held in the hand and yet capable of holding from four to six inches of "newspaper" type, and which implement is provided with a movable section for holding head-lines, italics, &c., when sorting or distributing or when changing market-quotations and the like; fourth, to provide a simple, convenient, and practical implement which saves time and labor, prevents pi, and increases the printer's comfort in the handling of type. These purposes are attained in my invention by certain novel construction and combination of parts, which will be hereinafter described and claimed.

This invention is illustrated in the accompanying drawings.

Figure 1 is a perspective view of my implement held in a hand, the removable section attached. Fig. 2 shows a side view of the implement, showing the metallic buttons c c, whereby the removable section is attached. Fig. 3 is a side view of the removable section, showing its right side doubled with the two gourd-shaped eyelets by means of which the removable section is attached to the two metallic buttons of the main section. Fig. 4 is a section of the main implement, showing a side view of the buttons upon which the removable section is attached by means of the eyelets.

Similar letters of reference indicate corresponding parts.

My implement is made of steel or brass or other suitable metal, in form rectangular, similar to a shallow box with only one end. I make the sides at right angle to the bed. They may be made each half type-high. I prefer, however, to make the side on the right of the open end one-third or one-fourth type-high, as this is sufficient to prevent the type from sliding off the bed and gives more room to sort, separate, and seize the lines desired. I make the end approximately type-high and inclined slightly outward, as shown in *f* in Fig. 2. This construction permits type when placed in the implement to lean slightly against the end. They are then "off their feet." In sorting it is then only necessary to straighten the neighboring lines to get room to pick out any line wanted.

I make my implement the thickness of one "lead," wider inside than the length of the lines of type it is designed to handle. My implement for handling "thirteen-em" type I make thirteen ems and also the thickness of a lead-wide inside. This gives plenty of room for the type to slide into the implement. I bevel the bottom of the implement from below. This permits type being slid into the implement from an imposing-stone without obstruction. When handling the implement rapidly or setting same down hurriedly when in use, the type therein receive all the support necessary from the high side and the end of the implement by inclining the implement in the direction of that side and end, as will be apparent to a printer using same.

For attaching the removable section I prefer the button and eyelets, which I make as follows: In the upper part of the left-hand side of said implement I securely fasten by threads, and riveting preferred, two rivets with round flat heads slightly projecting from the outside thereof, as shown at *c c*, Figs. 2 and 4, upon which the removable section *b* buttons or locks by means of the gourd-shaped eyelets *d d*. I make the removable section the same shape as the main section, except very much shorter, and I make the right-hand side of the removable section the same height as the left-hand side of the main section and of one piece of metal doubled back from the upper part of the side, making two thicknesses thereof, with sufficient space between to permit the heads of rivets to be tightly gripped after they have been inserted through the gourd-shaped eyelets and the removable section has then been pressed downward and backward, and thus locked onto the main implement a. As my implement then appears, is shown in Fig. 1. However, the removable section may be attached by any similar method.

The implement may be used either with or without the removable section, as the various kinds of use may require.

Having thus described my invention, what I claim as new, and desire to secure by Letters Patent, is—

1. A type-handling implement composed of a shallow, rectangular metallic box having a bottom and two sides, one side being approximately half type-high, the other side being half as high as the side first mentioned, the higher side being provided with two round, flat-headed buttons, said implement having one end only, which end is made approximately type-high and is inclined slightly outward, said implement having the bottom of the open end thereof beveled to an edge from below, the flat-headed buttons being adapted to engage a removable section.

2. A type-handling implement composed of a shallow, rectangular metallic box having a bottom and two sides, one side approximately half type-high, the other side approximately one-half lower, said implement having but one end which is made approximately type-high and inclined slightly outward, the said implement being provided with buttons, in combination with a detachable section smaller than the main section and having eyelets adapted to engage the buttons upon the type-handling implement.

In testimony whereof I have signed my name to this specification in the presence of two subscribing witnesses.

DEWEY C. SHAW.

Witnesses:
EDWIN S. RIPLEY,
FREDERICK SHEPHERD.